US010170735B2

(12) United States Patent
Lee (10) Patent No.: US 10,170,735 B2
(45) Date of Patent: Jan. 1, 2019

(54) BATTERY PACK (71) Applicant: SAMSUNG SDI CO., LTD., Yongin-si, Gyeonggi-do (KR)

(72) Inventor: Do-Hyung Lee, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 511 days.

(21) Appl. No.: 14/510,360

(22) Filed: Oct. 9, 2014

(65) Prior Publication Data

US 2015/0132629 A1 May 14, 2015

(30) Foreign Application Priority Data

Nov. 12, 2013 (KR) .................. 10-2013-0137111

(51) Int. Cl.
*H01M 2/10* (2006.01)
*H01M 2/20* (2006.01)
*H01M 10/613* (2014.01)
*H01M 10/643* (2014.01)
*H01M 10/6561* (2014.01)

(52) U.S. Cl.
CPC ......... *H01M 2/1016* (2013.01); *H01M 2/202* (2013.01); *H01M 10/613* (2015.04); *H01M 10/643* (2015.04); *H01M 10/6561* (2015.04); *H01M 2/105* (2013.01)

(58) Field of Classification Search
None
See application file for complete search history.

(56) References Cited

U.S. PATENT DOCUMENTS

| 2011/0039142 | A1 | 2/2011 | Kwag et al. | |
| 2011/0135969 | A1 | 6/2011 | Baek | |
| 2011/0217587 | A1* | 9/2011 | An | H01M 10/02 429/156 |
| 2012/0237815 | A1 | 9/2012 | Kwak et al. | |
| 2013/0196198 | A1* | 8/2013 | Guner | H01M 2/1016 429/83 |
| 2013/0196204 | A1 | 8/2013 | Song et al. | |
| 2013/0316202 | A1 | 11/2013 | Bang et al. | |
| 2014/0154545 | A1* | 6/2014 | Kishii | H01M 2/1077 429/99 |

FOREIGN PATENT DOCUMENTS

| JP | 2004-171856 A | 6/2004 |
| JP | 2006-100148 A | 4/2006 |
| JP | 2010-277796 A | 12/2010 |
| JP | 2013-218931 A | 10/2013 |
| KR | 10-2006-0090464 A | 8/2006 |
| KR | 10-2011-0016820 A | 2/2011 |
| KR | 20-2012-0004839 U | 7/2012 |
| KR | 10-2012-0107371 A | 10/2012 |
| KR | 10-2013-0023039 A | 3/2013 |
| KR | 10-2013-0089178 A | 8/2013 |
| WO | WO 2007068223 * | 6/2007 |
| WO | WO 2013018331 * | 2/2013 |

OTHER PUBLICATIONS

Korean Office Action dated May 23, 2016.
Korean Registration Determination Certificate issued on Jun. 29, 2017 for Korean application No. 10-2013-137111.
Korean Office Action dated Nov. 28, 2016.

* cited by examiner

*Primary Examiner* — Ladan Mohaddes
(74) *Attorney, Agent, or Firm* — Lee & Morse P.C.

(57) ABSTRACT

A battery pack includes a plurality of batteries arranged in columns and rows, a first holder configured to accommodate upper parts of the batteries, a lateral surface of the first holder including first pins, and a second holder configured to accommodate lower parts of the batteries, a lateral surface of the second holder including consecutively arranged concave surfaces and convex surfaces, and the first pins of the first holder protruding toward the second holder and being combinable with the concave surfaces of the lateral surface of the second holder.

21 Claims, 7 Drawing Sheets

BATTERY PACK

CROSS-REFERENCE TO RELATED APPLICATION

Korean Patent Application No. 10-2013-0137111, filed on Nov. 12, 2013, in the Korean Intellectual Property Office, and entitled: "Battery Pack," is incorporated by reference herein in its entirety.

BACKGROUND

1. Field

One or more embodiments relate to battery packs.

2. Description of the Related Art

Unlike an un-rechargeable primary battery, a secondary battery denotes a chargeable and rechargeable battery, and is used for not only small high technique electronic devices, e.g., mobile phones, PDAs, and notebook computers, but also energy storage systems. According to high demand for a high output, the demand for a battery pack in which a plurality of secondary batteries are assembled is increased.

SUMMARY

According to one or more embodiments, a battery pack includes a plurality of batteries arranged in columns and rows, a first holder configured to accommodate upper parts of the batteries, a lateral surface of the first holder including first pins, and a second holder configured to accommodate lower parts of the batteries, a lateral surface of the second holder including consecutively arranged concave surfaces and convex surfaces, and the first pins of the first holder protruding toward the second holder and being combinable with the concave surfaces of the lateral surface of the second holder.

The lateral surface of the first holder may include consecutively formed concave surfaces and convex surfaces, and the first pins may be located on the concave surfaces of the lateral surface of the first holder.

The first pins may be interlocked with second grooves which are the most concave portions of the concave surfaces of the lateral surface of the second holder.

Upper and lower surfaces of the first and second holders may be opened.

At least one of the first and second holders may further include stoppers that contact upper surfaces or lower surfaces of the batteries to prevent the leaving of the batteries.

The first and second holders may further include cavities extending in a length direction of the batteries.

The cavities formed in the first holder may be fluidically connected to the cavities formed in the second holder.

The cavities may be formed on locations corresponding to the center of the neighboring batteries.

The battery pack may further include a first conductive plate that is disposed on the first holder and electrically connects the batteries; and a second conductive plate that is disposed on the second holder in a direction away from the first conductive plate and electrically connects the batteries.

The second holder may include second pins that are formed on the lateral surface of the second holder and protrude towards the first holder, the lateral surface of the first holder may include consecutively formed concave surfaces and convex surfaces, and the second pins of the second holder may be combined with the concave surface of the first holder.

The second pins may be interlocked with first grooves which are the most concave portions of the concave surface of the lateral surface of the first holder.

The first and second holders may have the same structure.

According to one or more embodiments, a battery pack also includes a plurality of batteries arranged in columns and rows, each of the plurality of batteries having a rounded side surface, a first holder configured to accommodate upper parts of the batteries, a lateral surface of the first holder including first concave surfaces and first convex surfaces along the rounded side surfaces of the plurality of batteries, a second holder configured to accommodate lower parts of the batteries, a lateral surface of the second holder including second concave surfaces and second convex surfaces along the rounded side surfaces of the batteries, and a plurality of first pins on the lateral surface of the first holder and protruding toward the second holder, the first pins being combinable with the second concave surfaces of the lateral surface of the second holder.

The second holder may include second hollows that surround lower side-surfaces of the batteries, wherein upper and lower surfaces thereof are opened, the second concave surfaces may include second grooves formed on locations corresponding to the locations between the neighboring second hollows, and the first pins and the second grooves may be interlocked with each other.

The second holder may further include second pins that are located on the lateral surface of the second holder and protrude towards the first holder, and the second pins combined with the first concave surface of the lateral surface of the first holder.

The first holder may include first hollows that surround upper side-surfaces of the batteries, wherein upper and lower surfaces thereof are opened, the first concave surfaces may include first grooves formed on locations corresponding to the locations between the neighboring first hollows, and the second pins and the first grooves may be interlocked with each other.

At least one of the first and second holders may further include stoppers that contact upper surfaces or lower surfaces of the batteries to prevent the leaving of the batteries.

An assembled body of the first and second holders may include cooling holes extending in the same direction as the length direction of the batteries.

The cooling holes may be formed on locations corresponding to the center of the neighboring batteries.

The battery pack may further include a first conductive plate that is disposed on the first holder and electrically connects the batteries; and a second conductive plate that is disposed on the second holder in a direction away from the first conductive plate and electrically connects the batteries.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. When the drawings are described, like reference numerals denote like elements throughout, and the descriptions of like elements are omitted.

It will be understood that, although the terms first, second, third, etc., may be used herein to describe various elements, these elements should not be limited by these terms. These terms are only used to distinguish one element, component, region, layer or section from another region, layer or section.

The singular forms include the plural forms unless the context clearly indicates otherwise. It will further understood that the terms "comprise" and/or "comprising" when used in this specification, they specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on" another element or layer, the element or layer may be directly on another element or layer or intervening elements or layers. Also, in the drawings, the dimensions of layers or elements may be exaggerated or reduced for convenience of explanation or clarity. For example, since the size and thickness of each of the constituents may be arbitrarily shown, embodiments are not limited by the depicted drawings.

Figure 1:
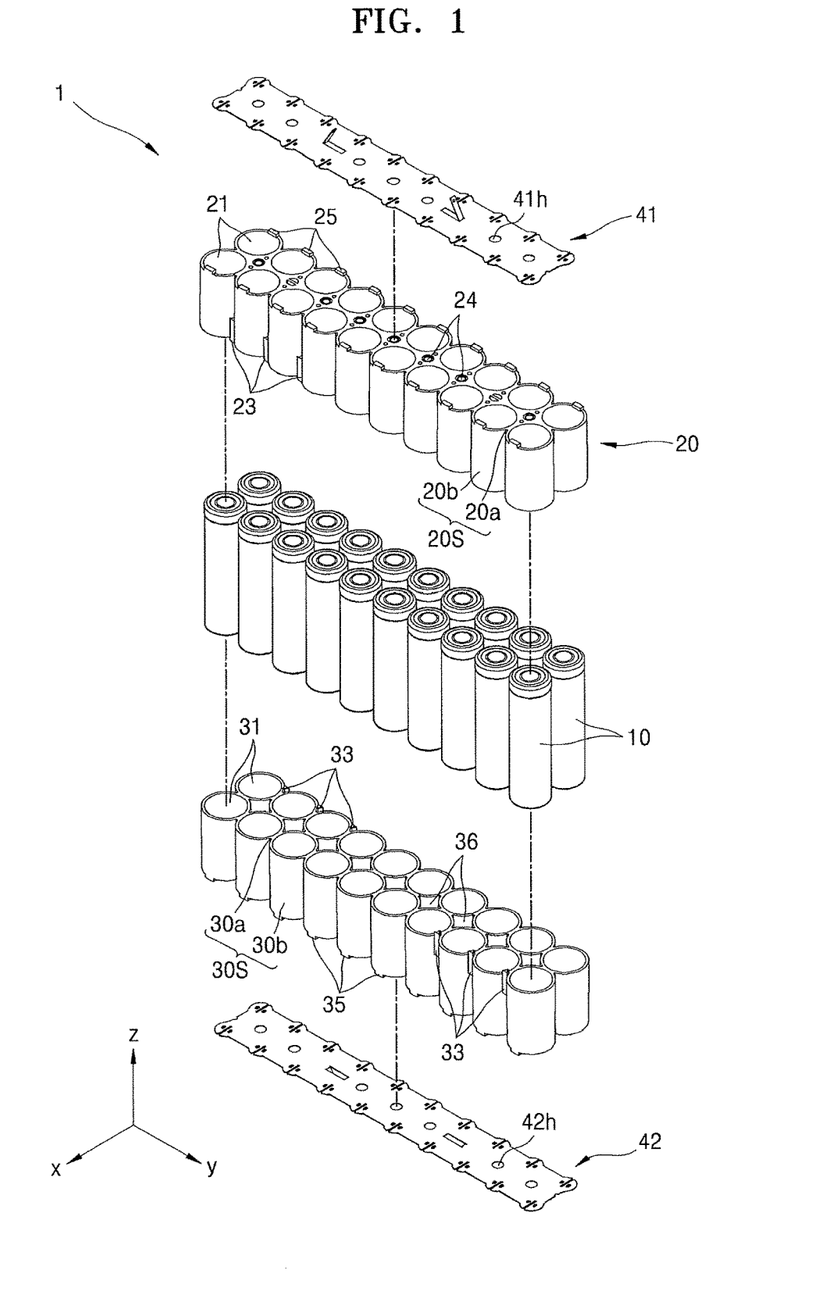
FIG. 1 illustrates a schematic perspective view of a battery pack according to an embodiment.

FIG. 1 illustrates a schematic perspective view of a battery pack 1 according to an embodiment.

Referring to FIG. 1, the battery pack 1 may include a plurality of batteries 10 that constitute, e.g., define, a plurality of columns and rows, a first holder 20 that accommodates upper parts of the batteries 10, a second holder 30 that accommodates lower parts of the batteries 10, and first and second conductive plates 41 and 42 for electrically connecting the batteries 10.

Each of the batteries 10 may be a chargeable and dischargeable cylindrical type battery. For example, the batteries 10 may be Ni—Cd batteries, Ni—H batteries, or Lithium (Li) batteries. The Li batteries have an operating voltage approximately three times higher than that of the Ni—Cd batteries or the Ni—H batteries that are used as power sources of mobile electronic equipment, and have a high energy density per unit weight, and thus, may be used for various purposes.

The first holder 20 and the second holder 30 may accommodate the batteries 10. For example, the first holder 20 may include first hollows 21 that have same diameters as those of the batteries 10 and have a height that is about ½ that of the batteries 10. The batteries 10 may be accommodated in the first holder 20 while upper parts of the batteries 10 are inserted into the first hollows 21. Upper parts and lower parts of the first hollows 21 are open, e.g., tops and bottoms of the hollows 21 are open to define hollow tubes. Thus, inner surfaces of the first hollows 21 and the upper parts, e.g., upper outer surfaces, of the batteries 10 contact each other.

The second holder 30 may include second hollows 31 that have same diameters as those of the batteries 10 and have a depth that is about ½ that of the batteries 10. The lower parts of the batteries 10 may be accommodated in the second hollows 31 while the lower parts of the batteries 10 are inserted into the second hollows 31. An upper surface and a lower surface of the second hollow 31 are open, e.g., tops and bottoms of the hollows 31 are open to define hollow tubes. Thus, inner surfaces of the second hollows 31 and the lower part, e.g., lower outer surfaces, of the batteries 10 contact each other.

As described above, the upper parts and lower parts of the batteries 10 are accommodated in the first holder 20 and the second holder 30, respectively, and the first holder 20 and the second holder 30 are combined with, e.g., attached to, each other. Thus, the batteries 10 may be assembled in the first holder 20 and the second holder 30. For the combination of the first holder 20 and the second holder 30, the first holder 20 and the second holder 30 respectively may include first pins 23 and second pins 33.

The first pins 23 are located on a side surface of the first holder 20 and may protrude toward the second holder 30 (in a (−z) direction in FIG. 1). As described above, when each of the batteries 10 has a cylindrical shape, a lateral surface 20s of the first holder 20 may include a concave surface 20a and a convex surface 20b along a rounded lateral surface of the cylindrical shape batteries 10, as will be described in more detail below with reference to FIG. 2. The first pin 23 may be disposed on the concave surface 20a of the lateral surface 20s of the first holder 20 that includes the concave surface 20a and the convex surface 20b.

The second pins 33 are disposed on a lateral, i.e., side, surface of the second holder 30 and may protrude toward the first holder 20 (in a (+z) direction in FIG. 1). As described above, when each of the batteries 10 has a cylindrical shape, i.e., the same as in the first holder 20, a lateral surface 30s of the second holder 30 may include a concave surface 30a and a convex surface 30b along a rounded lateral surface of the cylindrical shape batteries 10. The second pin 33 may be disposed on the concave surface 30a of the lateral surface 30s of the second holder 30 that includes the concave surface 30a and the convex surface 30b.

The first pin 23 that protrudes toward the second holder 30 may be inserted into the lateral surface 30s of the second holder 30, e.g., the concave surface 30a of the second holder 30. In detail, the first pin 23 may be inserted into a second groove G2 (see FIG. 4), i.e., a most concave surface of the concave surface 30a of the second holder 30. The second pin 33 that protrudes toward the first holder 20 may be inserted into the lateral surface 20s of the first holder 20, e.g., the concave surface 20a of the first holder 20. In detail, the second pin 33 may be inserted into a first groove G1 (see FIG. 3), i.e., a most concave surface of the concave surface 20a of the first holder 20. The first holder 20 and the second holder 30 may be combined with each other by including the batteries 10 therebetween through a combination of the first and second pins 23 and 33 with the concave surface 20a and concave surface 30a of the first holder 20 and the second holder 30, respectively.

The first hollows 21 of the first holder 20 have open upper and lower surfaces, and the upper parts of the batteries 10 may be inserted into the first hollows 21 through the lower surface of the first holder 20. At this point, first stoppers 25 may be provided on the upper surface of the first holder 20 to prevent the batteries 10 from leaving, i.e., without the first stoppers 25 the batteries 10 may slide or fall out of the first holder 20 through the open upper surface of the first holder 20. The leaving of the batteries 10 may be prevented by contacting the first stoppers 25 with the upper surfaces of the batteries 10 when the upper parts of the batteries 10 are inserted into the first hollows 21.

Upper surfaces and lower surfaces of the second hollows 31 of the second holder 30 are open, and the batteries 10 may be inserted into the second hollows 31 through an upper surface of the second holder 30. At this point, second stoppers 35 may be included on a lower surface of the second holder 30 to prevent the leaving of the batteries 10, i.e., without the second stoppers 35 the batteries 10 may slide or fall out of the second holder 30 through the open lower surface of the second holder 30. The leaving of the batteries 10 may be prevented by contacting the second stoppers 35 with the lower parts of the batteries 10 when the lower parts of the batteries 10 are accommodated in the first hollows 31.

The first and second conductive plates 41 and 42 are disposed at locations corresponding to the upper and lower surfaces of the batteries 10, respectively, and may be electrically connected to the batteries 10. For example, the batteries 10 may be connected in parallel by welding the first conductive plate 41 with the upper surfaces of the batteries 10 and the second conductive plate 42 with the lower surfaces of the batteries 10.

The first conductive plate 41 may include first openings 41h formed at locations corresponding to first holes 24 formed in the first holder 20. The second conductive plate 42 may include second openings 42h formed at locations corresponding to second holes 34 (see FIG. 6) of the second holder 30.

The first and second holes 24 and 34 formed in the first holder 20 and the second holder 30, respectively, may be inlets through which air may enter and leave for preventing overheating of the batteries 10. If there are no first and second openings 41h and 42h in the first and second conductive plates 41 and 42, the first and second holes 24 and 34 may be blocked, thereby blocking flows of air that enter into the first holder 20 and the second holder 30 or air that leaves from the first holder 20 and the second holder 30 to the outside. As a result, the batteries 10 may be overheated. A more detailed description of the structures of the first and second holes 24 and 34 which are formed in the first holder 20 and the second holder 30 will be provided below with reference to FIG. 6.

The first and second holders 20 and 30 may have the same structure. For example, the first and second holders 20 and 30 having the same structure and the same shape may be manufactured by hardening a resin, after injecting the resin in a mold having the same structure and shape. The manufacturing process of the battery pack 1 may be simplified by manufacturing the first holder 20 and the second holder 30 to have the same structure, e.g., to have an identical shape, using the same mold.

Figure 2:
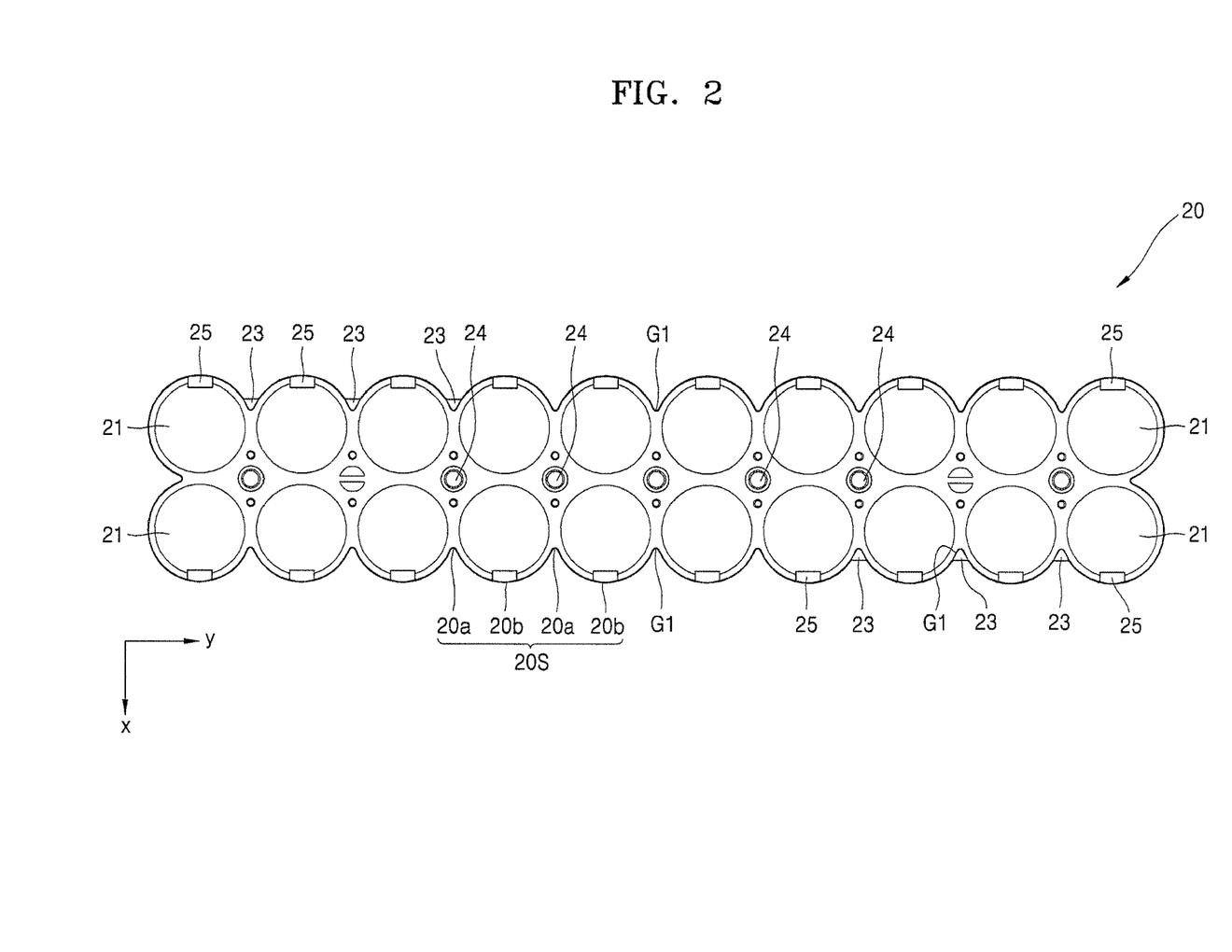
FIG. 2 illustrates a plan view of an upper surface of a first holder of FIG. 1.
Figure 3:
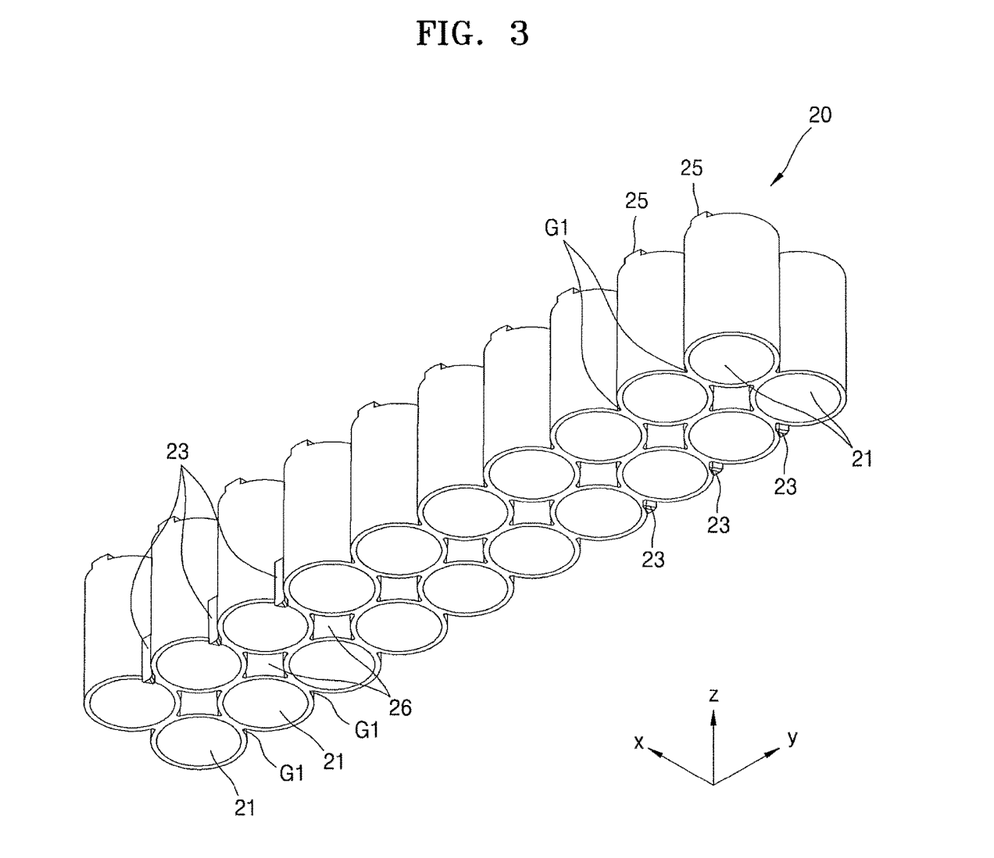
FIG. 3 illustrates a perspective view from a lower side of the first holder of FIG. 2.

FIG. 2 illustrates a plan view of an upper surface of the first holder 20 of FIG. 1. FIG. 3 illustrates a perspective view seen from a lower side of the first holder 20 of FIG. 2.

Referring to FIGS. 2 and 3, the upper surface and the lower surface of the first holder 20 are opened, and the upper parts of the batteries 10 may enter into the first holder 20 through the opened lower surface of the first holder 20. The first holder 20 includes the first hollows 21 arranged in columns and rows, and the batteries 10 that enter into the first holder 20 through the lower surface of the first holder 20 may be inserted into the first hollows 21.

Since the upper surface of the first holder 20 is opened, there is a possibility that the batteries 10 that are inserted into the first hollows 21 may leave through the upper surface of the first holder 20. In order to prevent the leaving of the batteries 10 through the upper surface of the first holder 20, the first stoppers 25 may be disposed on the upper surface of the first holder 20, e.g., on uppermost surfaces of sidewalls defining the first hollows 21.

The lateral surface 20s of the first holder 20 may include concave surfaces 20a and convex surfaces 20b along rounded lateral surfaces of the cylindrical shape batteries 10. For example, as illustrated in FIG. 2, the convex surfaces 20b may extend along, e.g., overlap, the, e.g., entire, rounded lateral surfaces of the cylindrical shape batteries 10, and the concave surfaces 20a may extend between adjacent batteries 10 along a length of the batteries 10, e.g., along an entire length of the first holder in the z direction. As depicted in FIGS. 2 and 3, the concave surfaces 20a and convex surfaces 20b are consecutively formed on the lateral surface 20s of the first holder 20, and the concave surfaces 20a of the first holder 20 may include the first groves G1 formed at locations corresponding to regions between neighboring first hollows 21. For example, the concave surfaces 20a may define the grooves G1.

The first pins 23 may be formed on the lateral surface 20s of the first holder 20, e.g., on the concave surface 20a of the first holder 20. In detail, the first pins 23 may be located on at least one of the first groove G1 formed on the first holder 20. The first pins 23 may protrude further than the lower surface of the first holder 20 along a direction (the (−z) direction of FIG. 3) directed toward the second holder 30.

The first holder 20 may include the first holes 24 and first cavities 26 that are connected to the first holes 24, e.g., the first holes 24 and the first cavities 26 may extend in a same direction and be continuous with each other. The first holes 24 are formed on the first holder 20, and the first cavities 26 are connected to the first holes 24 that are formed on the upper surface of the first holder 20 and may extend in the same direction as a length direction of the batteries 10 (or a length direction of the first hollows 21). The first cavities 26 may be formed in a center of neighboring batteries 10 of the batteries 10 that are disposed to form columns and rows, e.g., in a region corresponding to a center among four first hollows 21 adjacent to each other along two different directions.

If there are no first cavities 26 in the first holder 20 in a process of manufacturing the first holder 20 by hardening a resin, after injecting the resin in a mold, a relatively large amount of resin may be injected into the locations corresponding to a center among neighboring first hollows 21. As a result, a hardening speed of the resin in these locations, i.e., locations with a relatively large amount of resin, may be lower than other locations. As such, distortion of the first holder 20 may occur due to the different hardening speeds of the resin. However, according to the current embodiment, since the first cavities 26 are formed in the locations corresponding to the center of the neighboring first hollows 21, the distortion phenomenon of the first holder 20 due to the non-uniform injection of the resin may be prevented.

Also, the first cavities 26 may contribute to the cooling of the batteries 10 that are located in the first hollows 21, as they are in fluid connection, e.g., communication, with the first holes 24. For example, external air that enters through the first holes 24 may cool the overheated batteries 10 while moving to the first cavities 26 connected to the first holes 24. Similarly, air heated by the heat of the batteries 10 in the first cavities 26 may be discharged to the outside through the first holes 24 connected to the first cavities 26. Accordingly, overheating, and a resultant degradation of the batteries 10, may be prevented through circulation of air as described above.

In FIG. 3, the first cavity 26 is formed at a location corresponding to a center of four neighboring first hollows 21, but the current embodiment is not limited thereto. For example, the first cavity 26 may be formed at a location corresponding to a center of three batteries 10 or more that neighbor according to the arrangement of the batteries 10, i.e., a center of three or more neighboring first hollows 21.

Figure 4:
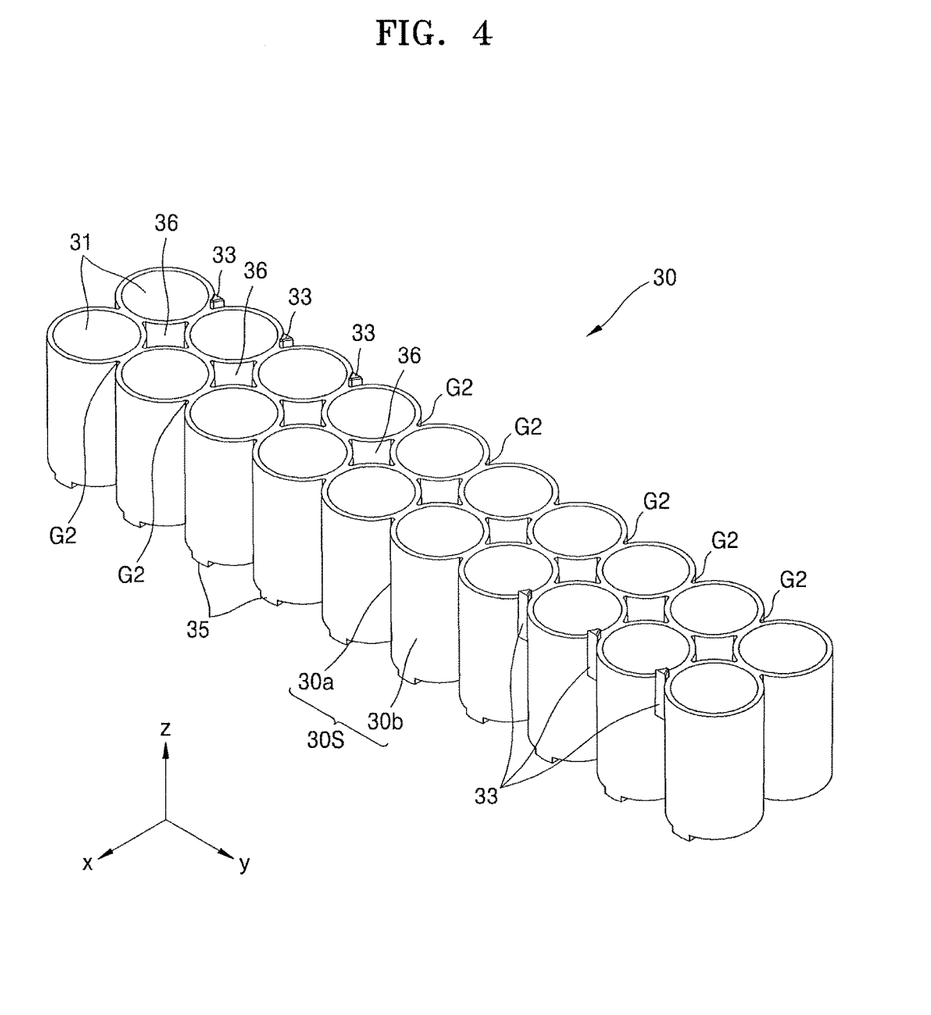
FIG. 4 illustrates a perspective view of a second holder of FIG. 1.

FIG. 4 illustrates a perspective view of the second holder 30 of FIG. 1.

Referring to FIG. 4, the upper and lower surfaces of the second holder 30 are opened, and the lower parts of the batteries 10 may be inserted into the second holder 30 through the open upper surface of the second holder 30. The second holder 30 includes the plurality of the second hollows 31 arranged along columns and rows, and the batteries 10 that are inserted through the upper surface of the second holder 30 may be inserted into the second hollows 31. The second hollows 31 are provided to face the first hollows 21.

Since the lower surface of the second holder 30 is open, there is a possibility that the batteries 10 that are inserted into the second hollows 31 may leave through the lower surface of the second holder 30. In order to prevent the leaving of the batteries 10 through the lower surface of the second holder 30, the second stoppers 35 may be disposed on the lower surface of the second holder 30, e.g., on the lower surfaces of the second hollows 31.

The lateral surface 30s of the second holder 30 may include the concave surfaces 30a and the convex surfaces 30b along rounded lateral surfaces of the cylindrical shape batteries 10. As depicted in FIG. 4, the concave surfaces 30a and convex surfaces 30b are consecutively formed on the lateral surface 30s of the second holder 30, and the concave surface 30a may include the second grooves G2 formed at locations corresponding to regions between the neighboring second hollows 31.

The second pins 33 may be formed on the lateral surface 30s of the second holder 30, e.g., on the concave surface 30a of the second holder 30. In detail, the second pin 33 may be located on at least one second groove G2 of the plurality of the second grooves G2 formed on the second holder 30. The second pin 33 may protrude further than the upper surface of the second holder 30 in a direction oriented toward the first holder 20, e.g., along the z direction in FIG. 4.

The second holder 30 may include the second holes 34 (FIG. 6) and second cavities 36 that are connected to the second holes 34. The second holes 34 are formed on the lower surface of the second holder 30 facing the first holes 24. The second cavities 36 may be connected to the second holes 34 formed on the lower surface of the second holder 30 and may extend in the same direction as a length direction of the batteries 10 (or in a length direction of the second hollows 31). The second cavities 36 may be formed at a center of neighboring batteries 10 of the batteries 10 that are disposed to form columns and rows, e.g., at locations corresponding to the center of the neighboring second hollows 31.

In the process of manufacturing a second holder 30 by hardening a resin, after injecting the resin in a mold, if there are no second cavities 36 in the second holder 30, a relatively large amount of resin may be injected into the locations corresponding to the center of neighboring second hollows 31. As a result, a hardening speed of the resin at the locations where a relatively large amount of resin is injected may be slower than at other locations. Therefore, distortion of the second holder 30 may occur due to the different hardening speed of the resin at locations corresponding to the centers of the neighboring second hollows 31 and at other locations. However, according to the current embodiment, since the second cavities 36 are formed at the locations corresponding to the center of the neighboring second hollows 31, the distortion phenomenon of the second holder 30 due to the non-uniform injection of the resin may be prevented.

Figure 6:
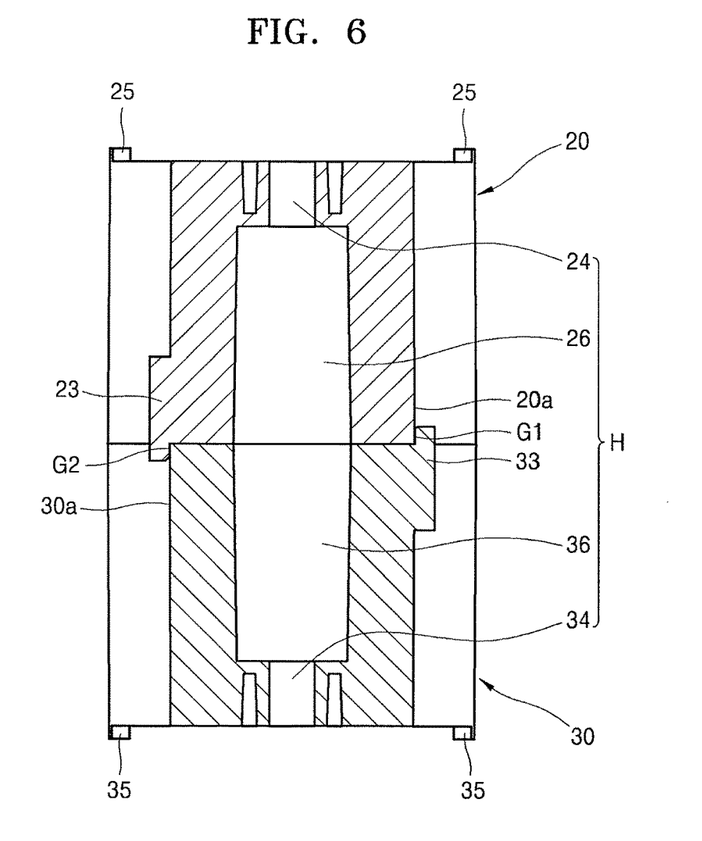
FIG. 6 illustrates a cross-sectional view taken along line VI-VI of FIG. 5.

Also, as described above with reference to the contribution of the first cavities 26 to the cooling of the batteries 10, the second cavities 36 may also contribute to the cooling of the batteries 10 in the second hollows 31, as the second cavities 36 are in fluid communication with the second holes 34. That is, the second cavities 36 are formed t locations corresponding to the first cavities 26, and thus, the first cavities 26 and the second cavities 36 may be connected to each other when the first and second holders 20 and 30 are combined with, e.g., attached to, each other. As a result of connecting the first cavities 26, which are connected to the first holes 24, and the second cavities 36, which are connected to the second holes 34, cooling holes H (FIG. 6) extending along a direction parallel to the length direction of the batteries 10 may be formed in the first and second holders 20 and 30. For example, as illustrated in FIG. 6, the cooling holes H may extend through an entire height of the combined first and second holders 20 and 30 along the z direction. Thus, overheating of the batteries 10 may be prevented through the cooling holes H. A further description of the cooling holes H will be provided below with reference to FIG. 6.

As described previously, the first and second holders 20 and 30 described with reference FIGS. 2 through 4 may be combined with each other by using the first and second pins 23 and 33. For example, as illustrated in FIG. 2, a cross-sectional view of the first pin 23 formed in the first holder 20 (as viewed in plan view) may have a substantial triangular shape and may protrude toward the second holder 30. Also, as illustrated in FIG. 4, the second groove G2 of the concave surfaces 30a, e.g., the most concave portion of the concave surface 30a of the second holder 30, may have an approximate triangular shape, and thus, the first pin 23 may be combinable, e.g., combined, with the second groove G2. For example, as the concave surface 30a of the second holder 30 may define an approximate triangular shape, a corner of the triangular first pin 23 may be inserted into the groove G2 defined by the approximate triangular shape of the concave surface 30a.

Likewise, the second pins 33 formed in the second holder 30 may be combined with the first grooves G1. That is, cross-sectional views of the second pins 33 may have substantial triangular shapes and protrude toward the first holder 20, and the first grooves G1 of the concave surfaces 20a of the first holder 20, i.e., the most concave portions of the concave surfaces 20a of the first holder 20, may have substantial triangular shapes. Thus, the second pins 33 may be combined with the first grooves G1.

Figure 5:
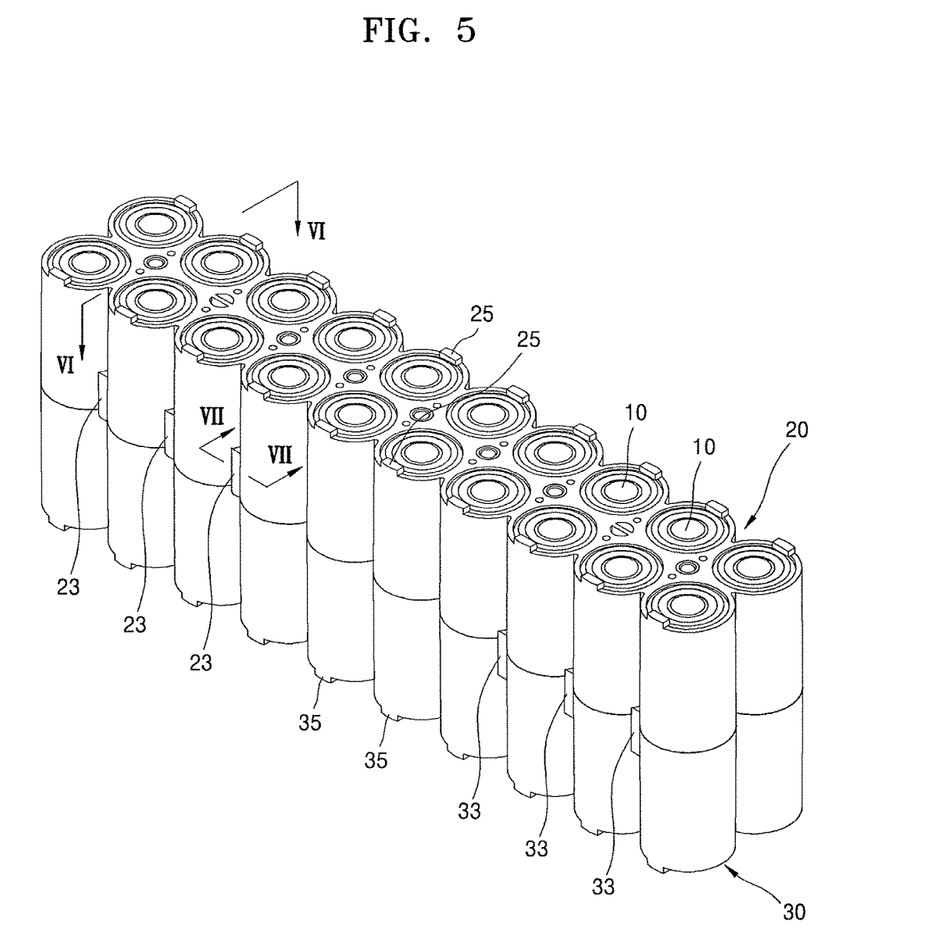
FIG. 5 illustrates a perspective view of a combined state of the first holder and the second holder.
Figure 7:
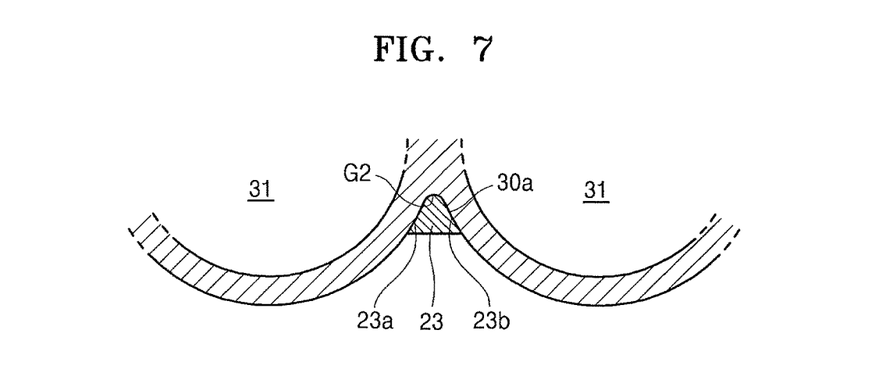
FIG. 7 illustrates a cross-sectional view taken along line VII-VII of FIG. 5.

FIG. 5 illustrates a perspective view of the combined first holder 20 and second holder 30. FIG. 6 illustrates a cross-sectional view taken along line VI-VI of FIG. 5. FIG. 7 illustrates a cross-sectional view taken along line VII-VII of FIG. 5.

Referring to FIGS. 5 and 6, the first pin 23 formed on the lateral surface of the first holder 20, e.g., on the concave surface 20a of the first holder 20, protrudes further than the lower surface of the first holder 20 along a direction oriented toward the second holder 30. The second pin 33 formed on the concave surface 30a of the second holder 30 protrudes further than the upper surface of the second holder 30 along a direction oriented toward the first holder 20.

The first pin 23 and the second pin 33 are disposed opposite to each other, and the first pin 23 may be slidingly combined with the concave surface 30a of the second holder 30, so that the first and second holders 20 and 30 may be assembled with the battery 10 therebetween. That is, the first pin 23 may have an interlocking or engaging shape with the second groove G2, which is the most concave portion of the concave surface 30a of the second holder 30, and the second pin 33 may have an interlocking or engaging shape with the first groove G1, which is the most concave portion of the concave surface 20a of the first holder 20. Thus, the first pin 23 and the second pin 33 are respectively combined with the second and first grooves G2 and G1.

Referring to FIG. 7, the cross-section of the first pin 23 may have a substantially triangular shape. Since the first pin 23 is formed at a location corresponding to a region between neighboring first hollows 21 of the concave surface 20a of the first holder 20, first and second surface 23a and 23b of the first pin 23 that contact the concave surface 30a of the second holder 30 may be rounded. The second groove G2 may also have a rounded surface, since the second groove G2 is formed at a location corresponding to a region between neighboring second hollows 31 of the concave surface 30a of the second holder 30. When the first pin 23 and the second groove G2 are combined, the first and second surfaces 23a and 23b of the first pin 23 are interlocked with the second groove G2 while contacting the rounded surface of the second groove G2. As described above, through the combination of the first pin 23 and the second groove G2, the first and second holders 20 and 30 may be assembled.

Likewise, since the second pin 33 is formed at a location corresponding to a region between the neighboring second hollows 31 of the concave surface 30a of the second holder 30, first and second surfaces of the second pin 33 that contact the concave surface 20a of the first holder 20 may be rounded. Also, since the first groove G1 is formed at a location corresponding to a region between the neighboring first hollows 21 of the concave surface 20a of the first holder 20, the first groove G1 may have a rounded surface. When the second pin 33 and the first groove G1 are combined, the second pin 33 is interlocked with the first groove G1 while the first and second surfaces of the second pin 33 contact the rounded surface of the first groove G1. The first and second holders 20 and 30 may be assembled through the combination of the second pin 33 and the first groove G1.

As depicted in FIG. 5, an assembled body of the first and second holders 20 and 30 that are assembled by using the first and second pins 23 and 33 may further be fixedly combined by welding the batteries 10 with the first and second conductive plates 41 and 42. In detail, even though the first and second holders 20 and 30 are combined with each other through the combination of the first and second pins 23 and 33 with the second groove G2 and the first groove G1, respectively, a large impact applied to the assembled body may potentially separate the first and second pins 23 and 33 from the second groove G2 and the first groove G1. However, in the current embodiment, as the upper surfaces of the batteries 10 are welded to the first conductive plate 41 above the first holder 20, and the lower surfaces of the batteries 10 are welded to the second conductive plate 42 under the second holder 30, stability of the battery pack 1 may be maintained despite an impact applied to the assembled body. That is, as long as the welding between the first and second conductive plates 41 and 42 and the batteries 10 is not disconnected, the first and second holders 20 and 30 may be fixedly combined.

Referring to FIG. 6, the assembled body of the first and second holders 20 and 30 may include the cooling hole H that extends in the length direction of the batteries 10 (the z direction in FIG. 6). As described above, the first cavity 26 of the first holder 20 and the second cavity 36 of the second holder 30 are formed at corresponding locations, and since the first cavity 26 is connected to the first hole 24 formed in the upper surface of the first holder 20 and the second cavity 36 is connected to the second hole 34 formed in the lower surface of the second holder 30, the first and second cavities 26 and 36 may be structurally and fluidically connected to the first and second holes 24 and 34 when the first and second holders 20 and 30 are combined. Therefore, the cooling hole H that is formed by connecting the first and second cavities 26 and 36 and the first and second holes 24 and 34 may provide a path for passing air, thereby preventing overheating of the batteries 10.

Figure 8:
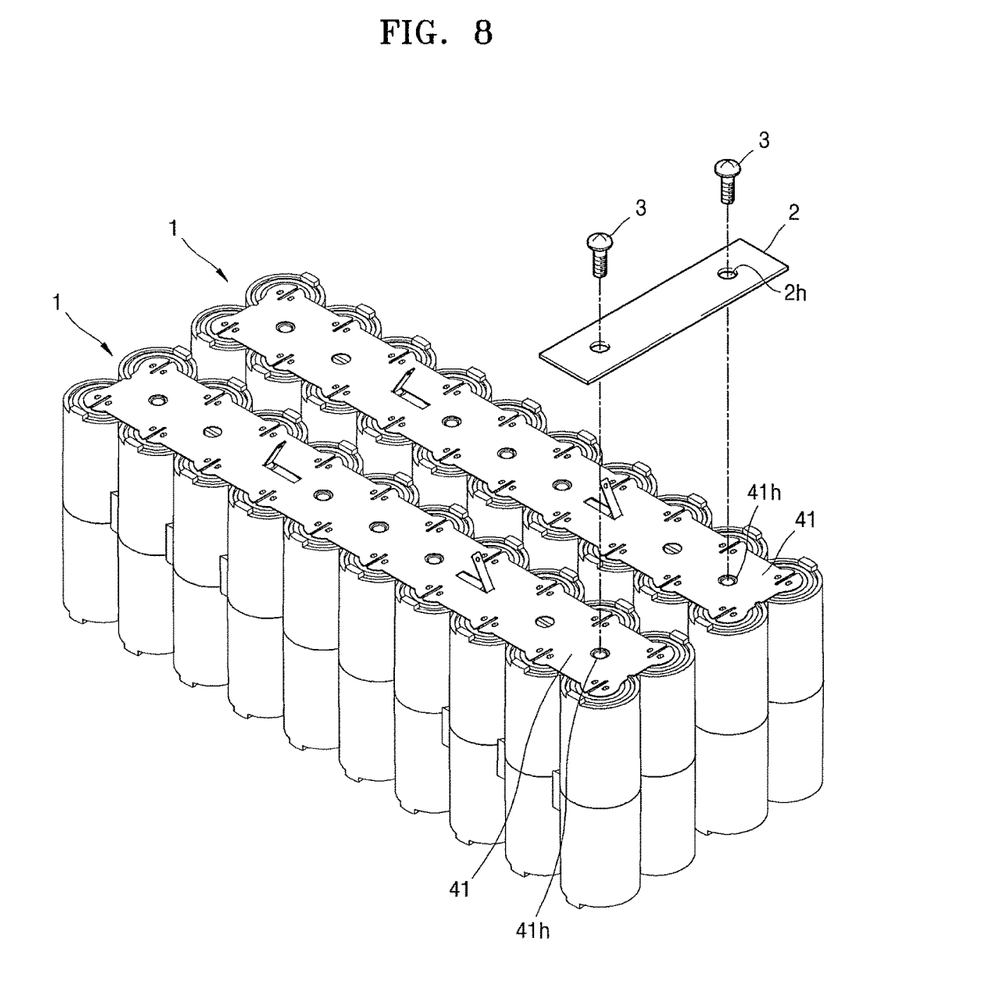
FIG. 8 illustrates a perspective view of a combined state of a plurality of battery packs electrically connected to each other.

FIG. 8 illustrates a perspective view of a plurality of battery packs 1 electrically connected to each other. Referring to FIG. 8, through holes formed on upper or lower surfaces of the battery pack 1, e.g., through the first and second holes 24 and 34 formed in the first and second holders 20 and 30 or through the first and second openings 41h and 42h formed in the first and second conductive plates 41 and 42, the plurality of the battery packs 1 may be electrically connected to each other.

After disposing bus bars 2 having combining holes 2h at locations corresponding to the first and second holes 24 and 34 formed in the first and second holders 20 and 30 or the first and second openings 41h and 42h formed in the first and second conductive plates 41 and 42, the battery packs 1 may be electrically connected to each other by using a connecting member 3, e.g., bolts. As an example of the current embodiment, if bolts are used as the connecting member 3, each inner circumference of the first and second holes 24 and 34 that are formed in the first and second holders 20 and 30 may include a female screw to be coupled with a male screw of a bolt.

As described above, according to the one or more of the above embodiments, the battery pack according to the current embodiment may increase assembly ability of the battery packs, i.e., a battery pack that may be readily assembled.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery pack, comprising:
a plurality of batteries arranged in columns and rows;

a first holder to accommodate upper parts of the plurality of batteries, the first holder including consecutively arranged external concave surfaces and external convex surfaces and a first pin on the external concave surfaces of the first holder, the external concave surfaces of the first holder being between lateral sides of adjacent batteries of the plurality of batteries; and a second holder to accommodate lower parts of the plurality of batteries, the second holder including consecutively arranged external concave surfaces and external convex surfaces, the external concave surfaces of the second holder being between the lateral sides of the adjacent batteries of the plurality of batteries, wherein the first pin of the first holder protrudes toward the second holder to connect to the external concave surfaces of the second holder, and is interlocked with the external concave surfaces of the second holder.

2. The battery pack as claimed in claim 1, wherein the first pin is between two adjacent batteries on a corresponding external concave surface of the first holder.

3. The battery pack as claimed in claim 1, wherein the first pin is interlocked with one of second grooves in the external concave surfaces of the second holder, the second grooves being defined by deepest portions of the external concave surfaces of the second holder, and the first pin being exposed.

4. The battery pack as claimed in claim 1, wherein the first and second holders are coupled to each other with the first pin of the first holder and a second pin of the second holder.

5. The battery pack as claimed in claim 4, wherein at least one of the first and second holders further includes stoppers in contact with corresponding upper surfaces or lower surfaces of the plurality of batteries, the stoppers to prevent the plurality of batteries from sliding out of the first or second holder.

6. The battery pack as claimed in claim 1, wherein the first and second holders further include cavities extending in a length direction of the plurality of batteries, the cavities including inner sides tracing outlines of lateral sides of two adjacent batteries.

7. The battery pack as claimed in claim 6, wherein the cavities in the first holder are in fluid communication with the cavities in the second holder.

8. The battery pack as claimed in claim 6, wherein the cavities are at locations corresponding to centers of neighboring batteries.

9. The battery pack as claimed in claim 1, further comprising:
a first conductive plate on the first holder and electrically connecting the plurality of batteries; and
a second conductive plate on the second holder and electrically connecting the plurality of batteries, the second conductive plate being spaced apart from the first conductive plate.

10. The battery pack as claimed in claim 1, wherein the second holder further includes a second pin on the external concave surfaces of the second holder, the second pin protruding toward the first holder to be adjacent to the external concave surfaces of the first holder, and being interlocked with the external concave surfaces of the first holder.

11. The battery pack as claimed in claim 10, wherein the second pin is interlocked with one of first grooves in the external concave surfaces of the first holder, the first grooves being defined by deepest portions of the external concave surfaces of the first holder.

12. The battery pack as claimed in claim 10, wherein the first and second holders have a same structure.

13. A battery pack, comprising:
a plurality of batteries arranged in columns and rows, each of the plurality of batteries having rounded side surfaces;
a first holder to accommodate upper parts of the plurality of batteries, the first holder including external concave surfaces and external convex surfaces along the rounded side surfaces of the plurality of batteries, the external concave surfaces of the first holder between lateral sides of adjacent batteries of the plurality of batteries;
a second holder to accommodate lower parts of the plurality of batteries, the second holder including external concave surfaces and external convex surfaces along the rounded side surfaces of the plurality of batteries, the external concave surfaces of the second holder between the lateral sides of the adjacent batteries of the plurality of batteries; and
a first pin on the external concave surfaces of the first holder and protruding toward the second holder to connect to the external concave surfaces of the second holder, the first pin being interlocked with the external concave surfaces of the second holder.

14. The battery pack as claimed in claim 13, wherein:
the second holder includes second hollows that surround lower side-surfaces of the plurality of batteries, upper and lower surfaces of the second hollows being open,
the external concave surfaces of the second holder include second grooves at locations corresponding to regions between neighboring second hollows, each of the external concave surfaces of the second holder being between two adjacent batteries, and
the first pin and the second grooves are interlocked with each other, the first pin being exposed.

15. The battery pack as claimed in claim 13, further comprising a second pin on the external concave surfaces of the second holder and protruding toward the first holder to be adjacent to the external concave surfaces of the first holder, the second pin being combinable with the external concave surfaces of the first holder.

16. The battery pack as claimed in claim 15, wherein:
the first holder includes first hollows that surround upper side-surfaces of the plurality of batteries, upper and lower surfaces of the first hollows being open,
the external concave surfaces of the first holder include first grooves at locations corresponding to regions between neighboring first hollows, and
the second pin and the first grooves are interlocked with each other.

17. The battery pack as claimed in claim 13, wherein at least one of the first and second holders includes stoppers in contact with corresponding upper surfaces or lower surfaces of the plurality of batteries, the stoppers to prevent the plurality of batteries from sliding out of the first or second holder.

18. The battery pack as claimed in claim 13, wherein an assembled body of the first and second holders includes cooling holes extending in a same direction as a length direction of the plurality of batteries.

19. The battery pack as claimed in claim 18, wherein the cooling holes are at locations corresponding to centers of neighboring batteries.

20. The battery pack as claimed in claim 13, further comprising:
- a first conductive plate on the first holder and electrically connecting the plurality of batteries; and
- a second conductive plate on the second holder and electrically connecting the plurality of batteries, the second conductive plate being opposite to the first conductive plate.

21. The battery pack as claimed in claim 1, wherein the first pin includes at least two surfaces facing the external concave surfaces of the second holder, and wherein the at least two surfaces of the first pin are directly coupled to the external concave surfaces of the second holder.

* * * * *